(12) United States Patent
Oh et al.

(10) Patent No.: US 11,422,035 B2
(45) Date of Patent: Aug. 23, 2022

(54) COLOR AND LUMINANCE MEASURING DEVICE INCLUDING FILTER UNIT

(71) Applicant: ANI. Co. Ltd, Suwon-si (KR)

(72) Inventors: Byung Jun Oh, Suwon-si (KR); Kyu Ho Lee, Anyang-si (KR); Kyu Seok Kim, Suwon-si (KR); Chang Hun Lim, Suwon-si (KR); Seung Yub Choi, Suwon-si (KR); Hyun Seock Oh, Suwon-si (KR); Taek Gyu Song, Ansan-si (KR)

(73) Assignee: ANI. Co. Ltd, Suwon-si (KR)

(*) Notice: Subject to any disclaimer, the term of this patent is extended or adjusted under 35 U.S.C. 154(b) by 0 days.

(21) Appl. No.: 17/261,883

(22) PCT Filed: Dec. 7, 2020

(86) PCT No.: PCT/KR2020/017713
§ 371 (c)(1),
(2) Date: Jan. 21, 2021

(87) PCT Pub. No.: WO2021/230452
PCT Pub. Date: Nov. 18, 2021

(65) Prior Publication Data
US 2022/0113194 A1  Apr. 14, 2022

(30) Foreign Application Priority Data
May 14, 2020  (KR) .................. 10-2020-0057560

(51) Int. Cl.
*G01J 3/50* (2006.01)
*G01N 21/25* (2006.01)
*G01N 21/66* (2006.01)

(52) U.S. Cl.
CPC .......... *G01J 3/506* (2013.01); *G01N 21/251* (2013.01); *G01N 21/66* (2013.01)

(58) Field of Classification Search
CPC ........ G01J 3/506; G01N 21/251; G01N 21/66
See application file for complete search history.

(56) References Cited

U.S. PATENT DOCUMENTS

| | | | | |
|---|---|---|---|---|
| 5,717,605 A | * | 2/1998 | Komiya ................ | G01J 3/0218 356/402 |
| 2005/0200732 A1 | * | 9/2005 | Tan ....................... | G01J 3/0286 348/262 |

(Continued)

FOREIGN PATENT DOCUMENTS

| JP | 2007-093477 A | | 4/2007 |
|---|---|---|---|
| KR | 20140003664 A | * | 1/2014 |

(Continued)

OTHER PUBLICATIONS

International Search Report of PCT/KR2020/017713 dated Mar. 11, 2021 from Korean Intellectual Property Office.

*Primary Examiner* — Sang H Nguyen
(74) *Attorney, Agent, or Firm* — Revolution IP, PLLC

(57) ABSTRACT

Disclosed is a color and luminance measuring device including a filter unit including a case which covers the entire device and has a light incident part formed on one side thereof through which measured light emitted from an object to be measured is incident, a measurement unit which measures luminance and a color by receiving the measured light in the case, and a filter unit which is disposed on a movement path of the measured light in the case to selectively control the luminance of the measured light transmitted to the measurement unit and transmit the measured light, wherein the filter unit reduces the luminance of the measured light to a predetermined level when the measured light has luminance of a predetermined level or higher and transmits the measured light to the measurement unit.

8 Claims, 8 Drawing Sheets

(56) References Cited

U.S. PATENT DOCUMENTS

2016/0011121 A1     1/2016  Tomioka
2016/0377483 A1*   12/2016  Oh .......................... G01J 3/506
                                                              356/416
2017/0370771 A1*   12/2017  Lee ....................... G01J 3/0208

FOREIGN PATENT DOCUMENTS

| KR | 10-1548017 B1    | 8/2015 |
| KR | 10-1705818 B1    | 2/2017 |
| KR | 10-2020-0014541 A | 2/2020 |
| KR | 102128899 B1 *   | 7/2020 |

* cited by examiner

[FIG. 1]
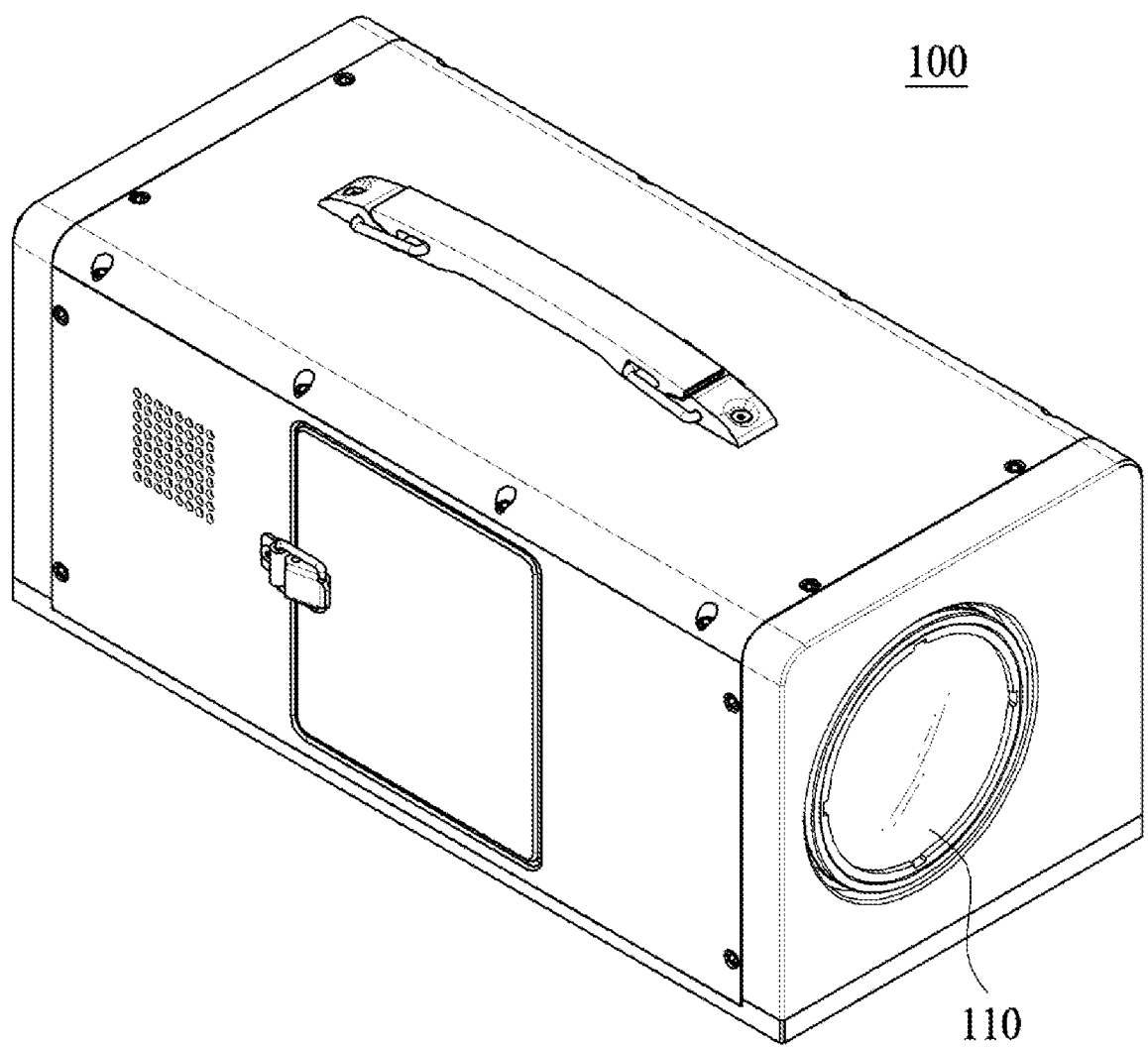

[FIG. 2]
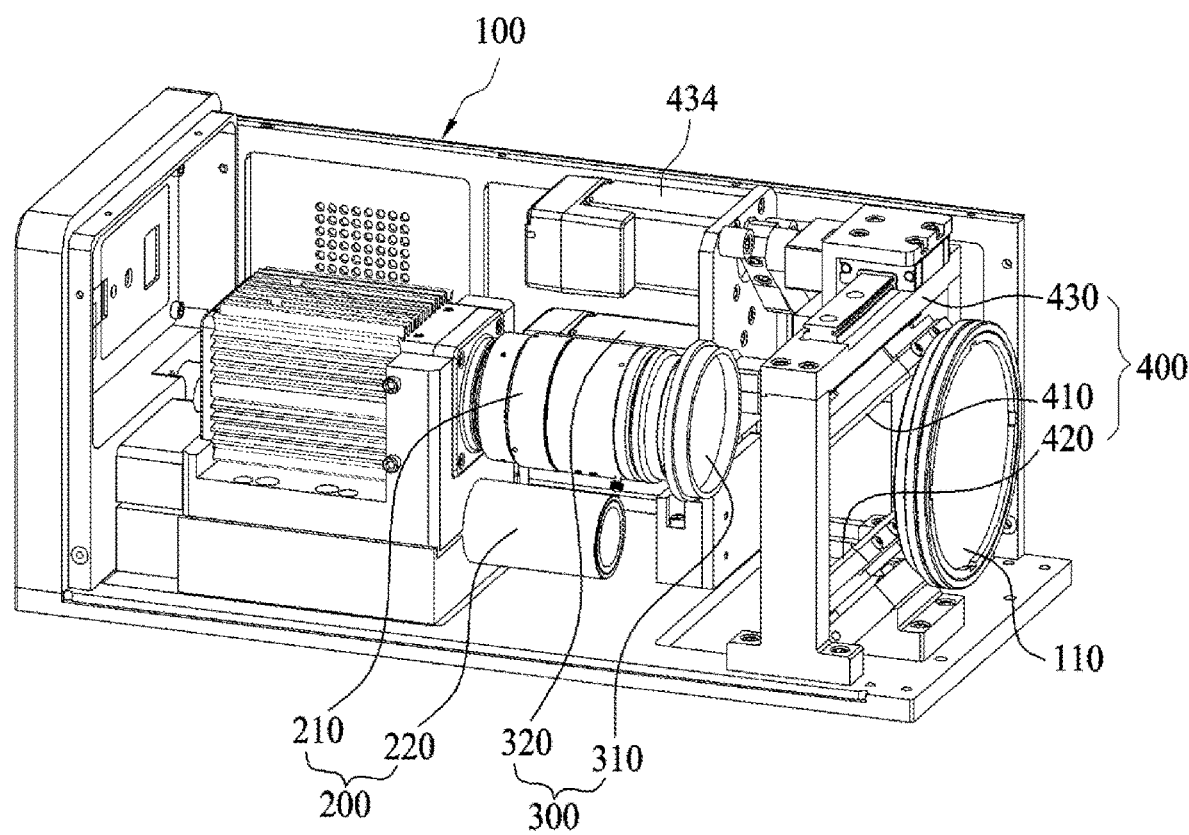

[FIG. 3]
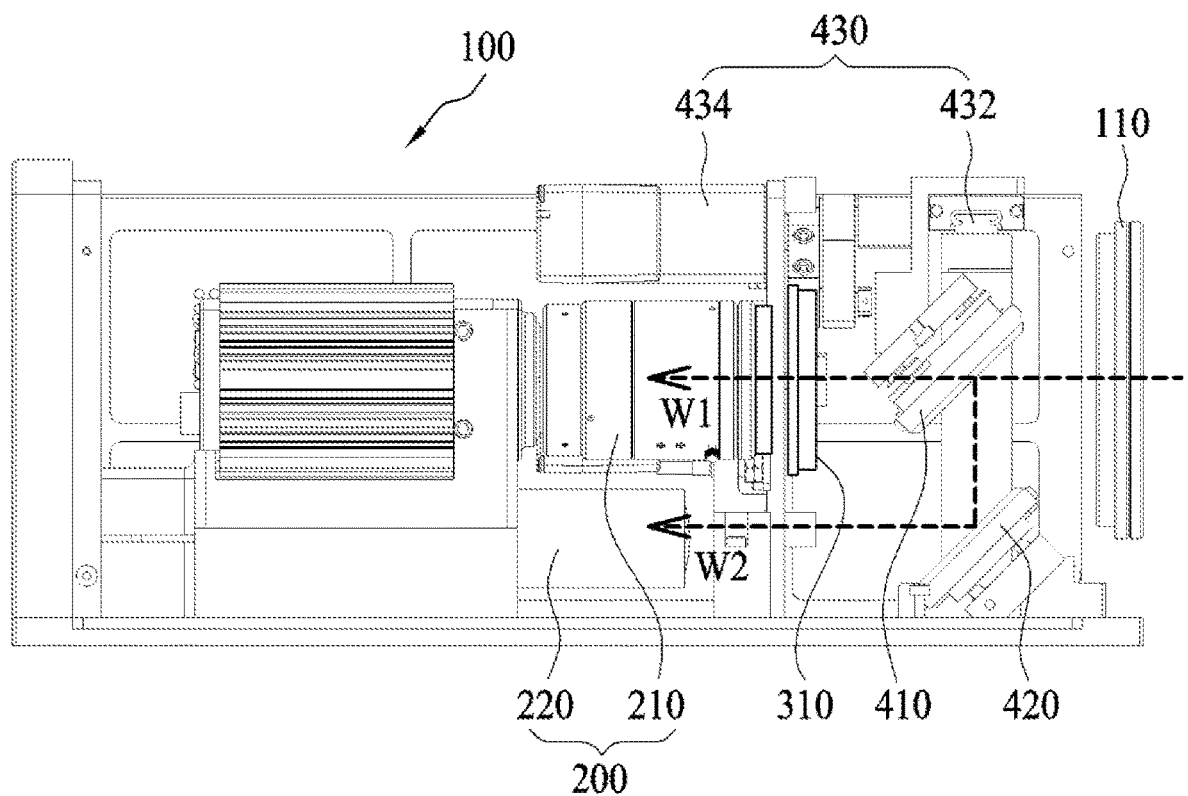

[FIG. 4]
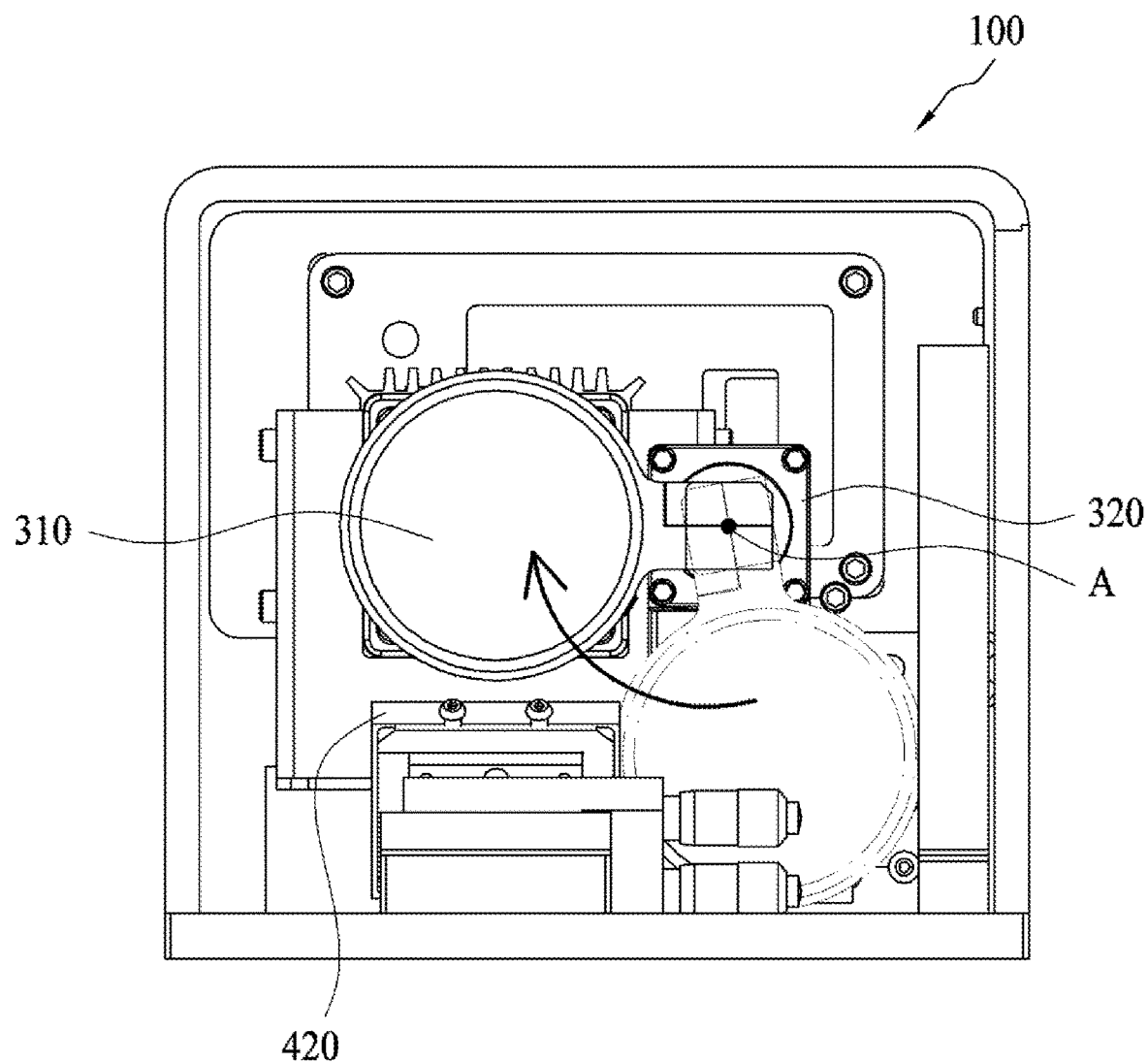

[FIG. 5]
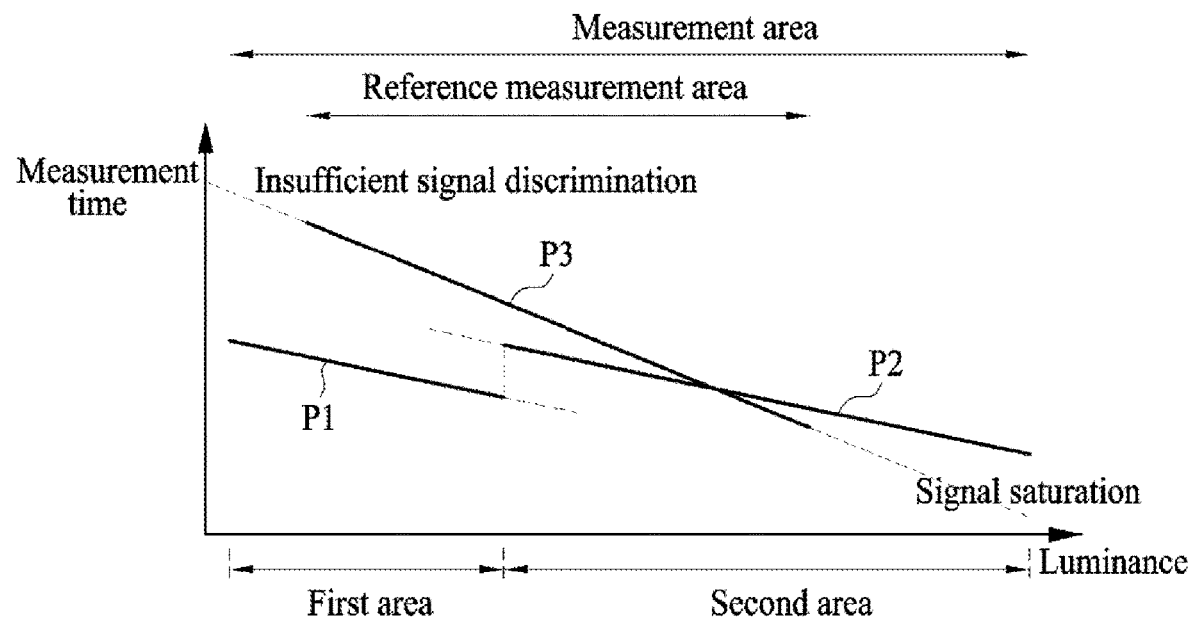
[FIG. 6]
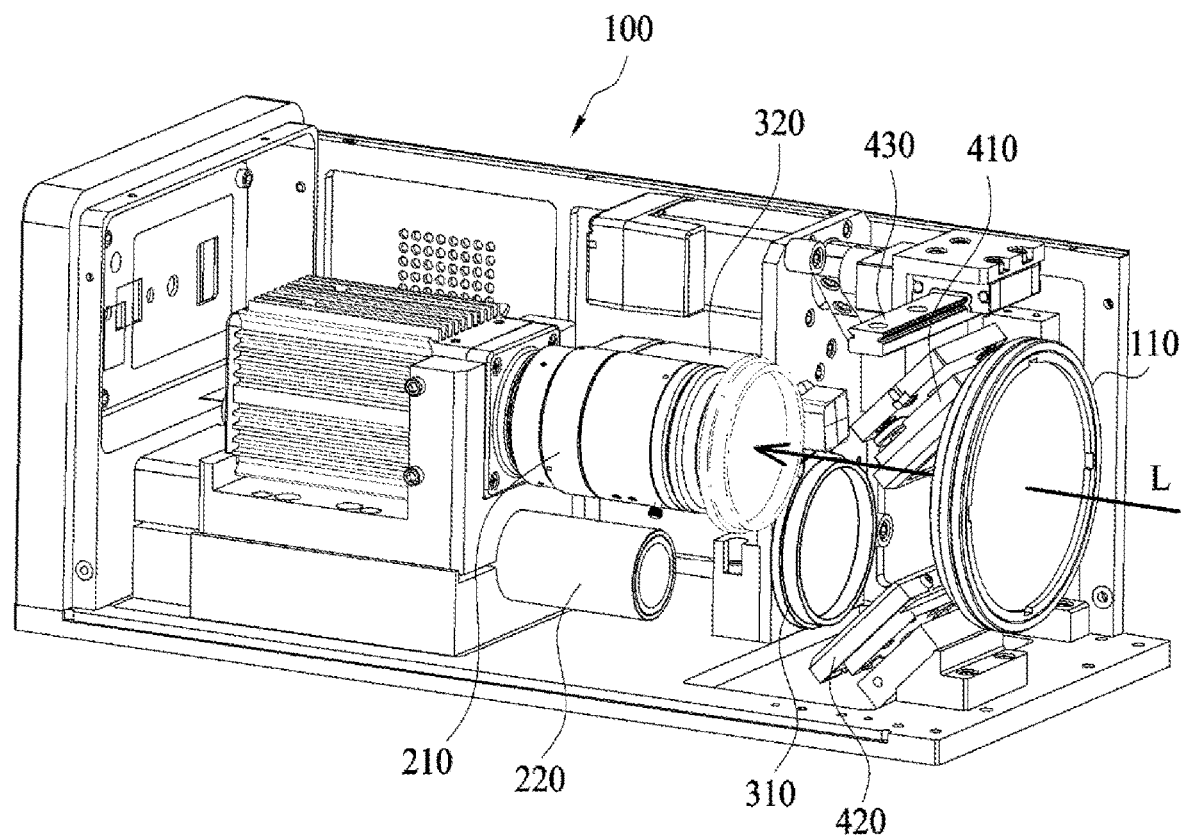

[FIG. 7]
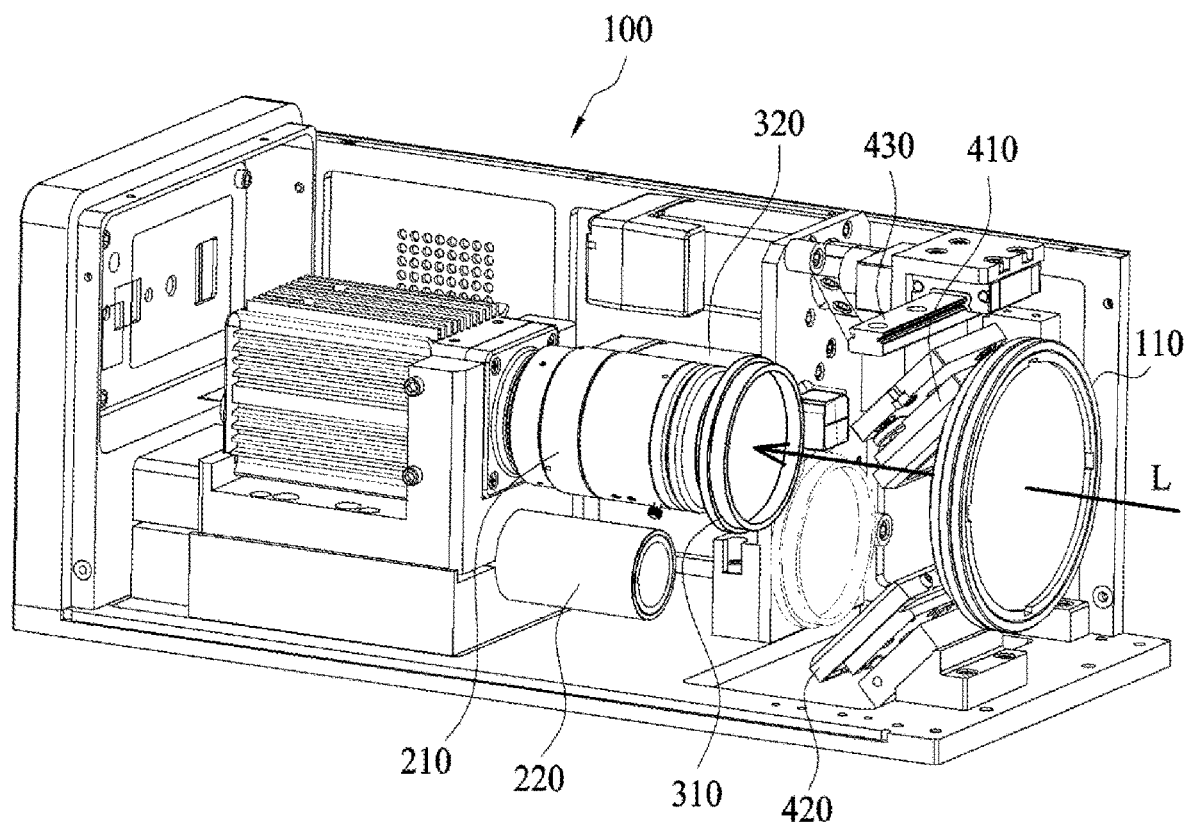

[FIG. 8]
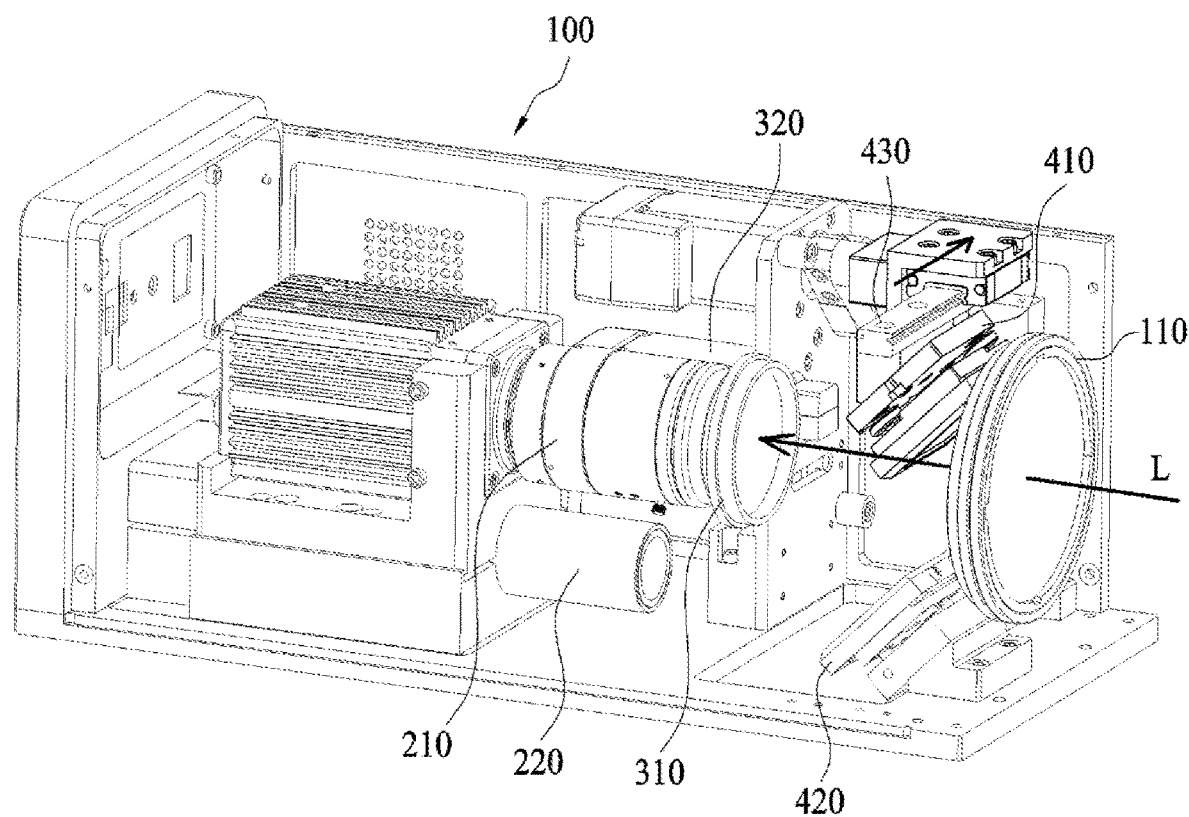

[FIG. 9]
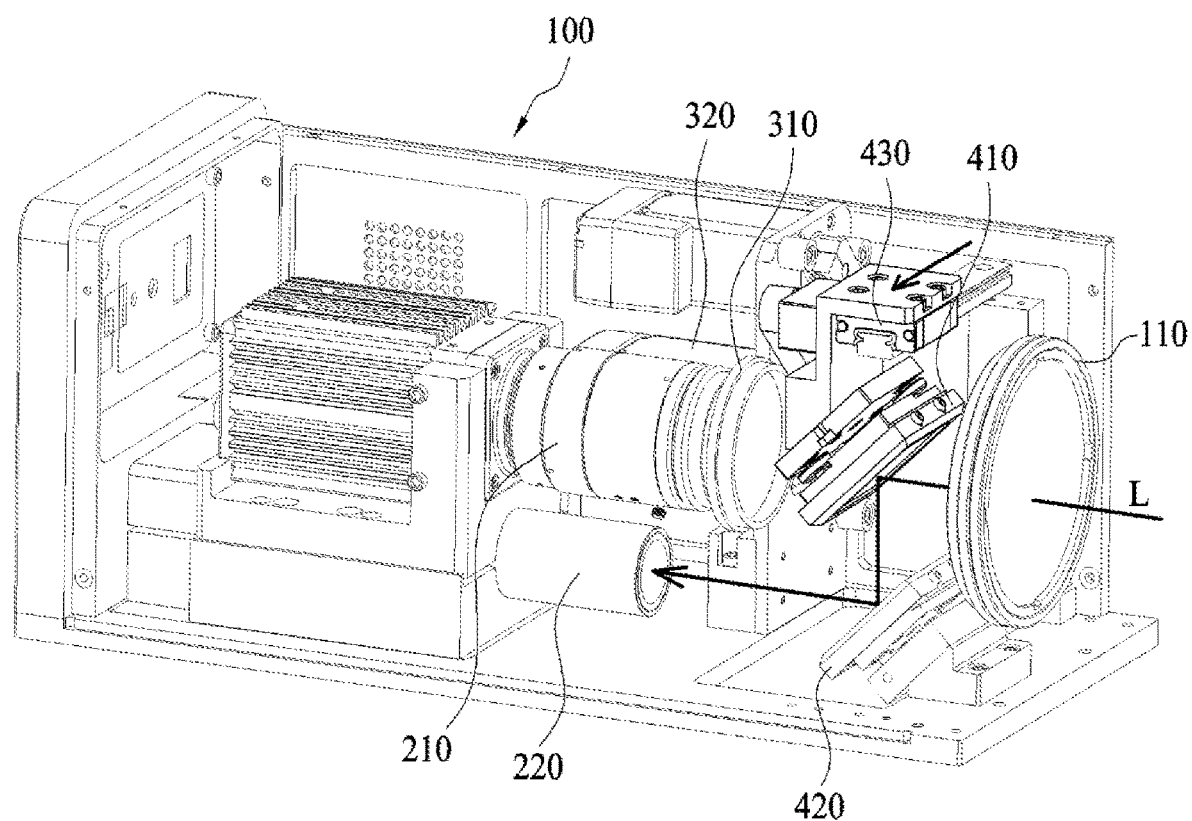

COLOR AND LUMINANCE MEASURING DEVICE INCLUDING FILTER UNIT

TECHNICAL FIELD

The present invention relates to a color and luminance measuring device including a filter unit, and more particularly, to a color and luminance measuring device including a filter unit capable of measuring even measured light with high and low-luminance by controlling luminance through a separate filter unit depending on the luminance of incident measured light to transmit the controlled luminance to a measurement unit.

BACKGROUND ART

Currently, the global monitor market is rapidly changing from CRTs to LCD monitors and from LCDs to LED monitors. In particular, as the demand for large-sized LED monitors increases, the production volume is rapidly increasing.

As the production volume of such displays increases, production quality also acts as one of the important factors, and thus, devices for determining whether there are defects or not have been developed. In particular, devices that measure whether luminance or color expressed on a display such as LCD or LED is correctly displayed have been developed.

In general, there is a difference between a configuration for measuring luminance and a configuration for measuring color, and devices therefor are also used, respectively.

In particular, in the case of a luminance meter, a predetermined level of quantity of light is required, and a color-difference meter is configured to measure the color of incident light by a detection sensor consisting of photodiodes, but due to the characteristics of the photodiodes, a detected value is changed according to changes in external environmental factors.

However, a lot of time is required for measurement by using these devices separately, and in particular, since a correct result is measured only when the light emitted from the same point is measured, it is difficult to use different devices.

In addition, when the luminance of the measured light is higher than a reference level or much lower than the reference level, there was a problem in that it was difficult to measure the luminance and the color of the measured light by a general method, and even if measured, it is difficult to obtain an accurate measurement result.

There is a need to improve these problems.

DISCLOSURE

Technical Problem

An object of the present invention is to solve the problems of the color and luminance measuring device including the filter unit in the related art, and to provide a color and luminance measuring device including a filter unit capable of measuring the luminance and the color even in measured light with luminance out of a reference range by providing a separate filter unit on a movement path of the measured light to control the luminance of the measured light and transmit the controlled luminance to a measurement unit and applying a correction algorithm corresponding to the controlled luminance.

Technical Solution

To solve the problems, according to an aspect of the present invention, a color and luminance measuring device including a filter unit includes a case which covers the entire device and has a light incident part formed on one side thereof through which measured light emitted from an object to be measured is incident, a measurement unit which measures luminance and color by receiving the measured light in the case, and a filter unit which is disposed on a movement path of the measured light in the case to selectively control the luminance of the measured light transmitted to the measurement unit and transmit the measured light, wherein the filter unit reduces the luminance of the measured light to a predetermined level when the measured light has luminance of a predetermined level or higher and transmits the measured light to the measurement unit.

The measurement unit may divide the measured light into a plurality of luminance areas and measure the luminance and the color of the measured light transmitted by applying a correction algorithm corresponding to each area.

The filter unit may include a filter which is provided in the case to control the luminance of the measured light to be transmitted, and a controller which is connected to the filter unit to control the filter to be selectively disposed between the light incident part and the measurement unit.

A plurality of filters may be configured to have different transmittances, and any one thereof may be disposed between the measurement unit and the light incident part by the controller.

Any one of the plurality of filters may transmit the measured light without reduction of the luminance.

The measurement unit may include a first measurer which is disposed on a first path through which the measured light incident through the incident part moves while maintaining a moving direction to measure at least one of the luminance and the color of the measured light, and a second measurer which has a path branched from the first path and is disposed on a second path through which the measured light is refracted or reflected at least one or more times and moves to measure the other one of the luminance and the color of the measured light which is different from the first measurer.

The color and luminance measuring device may further include a path control unit which transmits the measured light to either the first measurer or the second measurer, wherein the path control unit may be selectively driven to continuously transmit the measured light to the first measurer and the second measurer, respectively.

The path control unit may include a first reflector which is disposed adjacent to the light incident part and selectively positioned on the first path to reflect the measured light, a second reflector which is disposed on the downstream of the first reflector on the second path to reflect the measured light reflected from the first reflector, and a direction changer which is connected with the first reflector in the case and controls the position of the first reflector to control whether the first reflector is disposed on the first path.

The direction changer may be at least partially elongated and disposed adjacent to the light incident part to control the position of the first reflector by sliding along a longitudinal direction.

Advantageous Effects

In order to solve the above problems, the present invention has the following effects.

First, since the luminance is selectively controlled according to the luminance of the measured light incident through the light incident part to be transmitted to the measurement unit, there is an advantage of measuring color and luminance of measured light having luminance of a reference value or higher.

Second, since each correction algorithm is applied correspondingly to the degree to which the luminance of the measured light is controlled by the filter unit, there is an advantage of measuring even the measured light with high and low luminance so as to increase a measurement area of the measured light according to the luminance.

Third, since the first measurer and the second measurer are provided inside one device and the path of the measured light incident through the same light incident part is controlled to be transmitted to each measurement unit, there is an advantage of measuring both color and luminance of the measured light emitted from the same point without moving a separate device.

The effects of the present invention are not limited to the aforementioned effect, and other effects, which are not mentioned above, will be apparent to those skilled in the art from the description of the appended claims.

DESCRIPTION OF DRAWINGS

FIG. 1 is a view illustrating an appearance of a color and luminance measuring device including a filter unit according to an embodiment of the present invention;

FIG. 2 is a view schematically illustrating a configuration of the color and luminance measuring device including the filter unit of FIG. 1;

FIG. 3 is a cross-sectional view schematically illustrating an internal configuration of the color and luminance measuring device including the filter unit of FIG. 1;

FIG. 4 is a view illustrating an operation form of the filter unit in the color and luminance measuring device including the filter unit of FIG. 1;

FIG. 5 is a view illustrating a change in measurement time and a luminance measurement range according to the luminance of measured light to be changed by a filter in the color and luminance measuring device including the filter unit of FIG. 1;

FIG. 6 is a view illustrating a state in which the measured light is transmitted without changes by rotating the filter in FIG. 1;

FIG. 7 is a view illustrating a state in which the measured light passes through the filter in FIG. 1;

FIG. 8 is a view illustrating a state in which the measured light is incident to a first measurer along a first path in the color and luminance measuring device including the filter unit of FIG. 1; and FIG. 9 is a view illustrating a state in which the measured light is incident to a second measurer along a second path in the color and luminance measuring device including the filter unit of FIG. 1.

BEST MODE

A preferred embodiment of a color and luminance measuring device including a filter unit according to the present invention configured as such will be described with reference to the accompanying drawings. However, the embodiment is not intended to limit the present invention to a specific form, but to help in a clearer understanding of the present invention through the embodiment.

In describing the embodiment, like names and like reference numerals are used with respect to like components and the resulting additional description will be omitted.

The present invention is a device as one device capable of measuring whether color and luminance are correctly output in response to an input value by measuring the color and luminance using measured light L emitted from an object to be measured such as a display panel.

First, a configuration and an operation of a color and luminance measuring device including a filter unit according to the present invention will be described with reference to FIGS. 1 to 5.

FIG. 1 is a view illustrating an appearance of a color and luminance measuring device including a filter unit according to an embodiment of the present invention, FIG. 2 is a view schematically illustrating a configuration of the color and luminance measuring device including the filter unit of FIG. 1, and FIG. 3 is a cross-sectional view schematically illustrating an internal configuration of the color and luminance measuring device including the filter unit of FIG. 1.

In addition, FIG. 4 is a view illustrating an operation form of a filter unit 300 in the color and luminance measuring device including the filter unit of FIG. 1, and FIG. 5 is a view illustrating a change in measurement time and a luminance measurement range according to the luminance of measured light L to be changed by a filter 310 in the color and luminance measuring device including the filter unit of FIG. 1.

As illustrated in the drawings, the color and luminance measuring device including the filter unit according to the present invention largely includes a case 100, a measurement unit 200, a filter unit 300, and a path control unit 400, and receives the measured light L with luminance controlled selectively by the filter unit 300 to measure the color and luminance of the measured light.

Specifically, the case 100 covers the entire device and has a path through which the measured light L moves therein, and has a light incident part 110 formed on one side and through which the measured light L emitted from the object to be measured is incident. In this case, in the case 100, the light incident part 110 is formed toward the object 10 to be measured from which the measured light L is emitted, and it is preferred that the size of the light incident part 110 is formed as a size in which the measured light L may be sufficiently incident to the measurement unit 200 to be described below.

Here, the case 100 may be configured such that at least a part thereof is formed in a detachable shape, so that a part of the case can be selectively opened, and additional parts can be attached to or detached from the outside.

In the embodiment, the case 100 is formed in a quadrangular box shape as illustrated in the drawings, wherein the light incident part 110 is formed on one side thereof, and the measurement unit 200 and the filter unit 300 to be described below are disposed adjacent to the light incident part 110. In addition, a separate lens unit 500 may be provided in the light incident part 110 to control the measured light L.

Here, the case 100 has a movement path through which the light incident through the light incident part 110 moves, and the movement path may be formed by a separate structure, but unlike this, the movement path may also be formed simply by a moving direction of light without a separate structure.

In the present invention, the movement path may be configured to be branched into one or more paths corresponding to the configuration of the measurement unit 200 to be described below, and may be configured to selectively transmit the measured light L to any one path.

As such, the case 100 is formed in a shape to cover and protect the entire case, has the light incident part 110 formed on one side thereof, and may also be configured so that a space between the light incident part 110 and the first measurer 210 may be selectively open and exposed to the outside.

Meanwhile, the measurement unit 200 measures the luminance and the color by receiving the measured light L from the inside of the case 100.

Specifically, the measurement unit 200 is configured to measure the luminance and the color by receiving the measured light L, divides the measured light L into a plurality of luminance areas, and measures the luminance and the color of the measured light L transmitted by applying a correction algorithm corresponding to each area.

In this case, the measurement unit 200 controls whether or not the filter unit 300 to be described below or a type of the applied filter 310 is applied according to the luminance area of the measured light L, and the correction algorithm corresponding thereto is selected.

The measurement unit 200 according to the present invention is configured to collect multiple pieces of information from the measured light L through one or more measurers, and in the embodiment, the measurement unit 200 includes a first measurer 210 which measures at least one of the luminance and the color of the measured light L, and a second measurer 220 which is disposed separately from the first measurer 210 to measure the other one of the luminance and the color.

Here, a plurality of measurement units 200 is configured, and each thereof independently receives and measures the measured light L, and the measured light L is transmitted to either the first measurer 210 or the second measurer 220 through the path control unit 400 to be described below to measure the color and the luminance.

In the present invention, as described above, the measurement unit 200 includes the first measurer 210 and the second measurer 220, and the first measurer 210 is disposed toward the light incident part 110 in the case 100 and measures the luminance of the measured light L incident through the light incident part 110.

Specifically, the first measurer 210 includes a general optical sensor and measures the luminance of the incident measured light L. Here, the first measurer 210 is disposed on a path through which the measured light L incident through the light incident part 110 moves to receive the measured light L.

Accordingly, in the case 100 according to the present invention, the first measurer 210 and the second measurer 220 are independently disposed therein, and a first path W1 and a second path W2 for transmitting the measured light L incident through the light incident part 110 are formed, respectively. In this case, the first path W1 and the second path W2 may also be formed by separate structures, but unlike this, the first path W1 and the second path W2 may also be formed simply by a moving direction of light without a separate structure.

In the embodiment, the first path W1 is formed in direct communication with the light incident part 110 so that the incident measured light L moves while maintaining the moving direction. Specifically, the first path W1 is a path through which the measured light L moves without passing through a separate mirror or beam splitter. In addition, the second path W2 is a path through which the measured light L incident through the light incident part 110 is branched from the first path W1 and moves, and the measured light L is refracted or reflected at least one time in the case 100 to move to the inside thereof.

As such, as the measurement unit 200 includes the first measurer 210 and the second measurer 220, the case 100 has the first path W1 and the second path W2 through which the measured light L is transmitted, respectively.

Meanwhile, in the present invention, the first measurer 210 is disposed to face the light incident part 110 on the first path W1, and the measured light L moving along the first path W1 is transmitted while maintaining the direction passing through the light incident part 110. Here, the first measurer 210 and the second measurer 220 to be described below are configured to independently measure both the luminance and the color, respectively, and may be set to measure either or both of the luminance and the color according to a situation.

In the embodiment, the first measurer 210 is configured to measure the luminance, and this is because the first measurer 210 is disposed to face the light incident part 110, and thus, the loss of the measured light L incident along the first path W1 is small.

In addition, the second measurer 220 is disposed adjacent to the inside of the case 100 separately from the first measurer 210, and is provided on the second path W2 to measure the luminance or the color of the measured light L.

Specifically, the second measurer 220 is provided on the second path W2 and receives the measured light L of which the path is changed by the path control unit 400 to be described below to measure the luminance or the color. Here, the second measurer 220 is a circuit configuration for measuring the color of the measured light L, and is disposed to face the direction in which the measured light L is transmitted on the second path W2 to measure the color of the measured light L.

As described above, the measurement unit 200 according to the present invention includes the first measurer 210 and the second measurer 220, which are independently disposed, and the measured light L is transmitted to any one to measure the luminance and the color of the measured light L.

Of course, unlike this, the measurement unit 200 according to the present invention may be configured as a single unit to measure both the luminance and the color by receiving the measured light L, and the measurement unit 200 is configured to include the first measurer 210 and the second measurer 220 as a just example.

Meanwhile, the filter unit 300 is disposed on the movement path of the measured light L in the case 100 to transmit the measured light L by selectively controlling the luminance of the measured light L transmitted to the measurement unit 200.

Specifically, the filter unit 300 transmits the measured light L on the incident light path of the measured light L and selectively controls the luminance of the measured light L. At this time, the filter unit 300 controls the luminance of the measured light L through at least one filter, and in the embodiment, the filter unit 300 is configured by one filter to lower the luminance of the measured light L to a predetermined level or transmit the measured light L as it is.

That is, the filter unit 300 reduces the luminance of the measured light L to a predetermined level when the measured light L has predetermined luminance or higher and transmits the measured light L to the measurement unit 200.

In the present invention, the filter unit 300 largely includes a filter 310 and a controller 320, and at least a part of the filter 310 is selectively disposed between the measurement unit 200 and the light incident part 110 in the case 100 to control the luminance of the measured light L. Here, the filter 310 is configured by at least one or more filters to have a radius of a predetermined level or more, and is configured to transmit the measured light L.

At this time, various types of filters 310 may be applied, and in the present invention, a neutral density (ND) filter is applied to reduce the luminance of the measured light L (in the embodiment, an ND64 filter is applied). The ND filter is a filter that adjusts the color balance by reducing the transmitting amount of light to be similar to each wavelength within a specific wavelength range, and has a characteristic of reducing the amount of light without a change in color reproduction.

When the luminance of the measured light L is equal to or higher than a predetermined level, the filter 310 configured above reduces the luminance while transmitting the measured light L, so that the measurement unit 200 may measure the luminance correctly.

In the embodiment, the filter 310 is configured as one unit so that the measured light L may be selectively transmitted or passed, but unlike this, a plurality of filter 310 is configured to have different transmittances and any one thereof may be controlled by the controller 320 to be disposed between the measurement unit 200 and the light incident part 110.

In particular, although the filter 310 is not illustrated in the drawing, the plurality of filters 310 have different transmittances and are arranged so that any one transmits the measured light L, and any one of the plurality of filters has a transmittance of 100% and may also be configured to transmit the measured light L without reduction of luminance.

As described above, the filter 310 according to the present invention is configured by at least one or more filters, and is configured to selectively transmit the measured light L to reduce the luminance or transmit 100% of the measured light L without reduction of luminance.

Meanwhile, one side of the controller 320 is connected to the filter 310 in the case 100 to control the filter to be selectively disposed on the movement path of the measured light L.

Specifically, at least a portion of the controller 320 is connected to the filter 310 and controls a position of the filter 310 through rotation or sliding. In the embodiment, the controller 320 has a separate motor as illustrated in the drawings, one side thereof is connected to the filter 310 and the other side thereof is connected to a rotation shaft A of the motor to control the arrangement of the filters 310 by controlling a rotational angle.

Of course, unlike illustrated in the drawings, the controller 320 partially slides through a separate frame without the rotation shaft A, and the filter 310 may be selectively disposed on the movement paths W1 and W2 of the measured light L.

As such, the filter unit 300 includes the filter 310 and the controller 320, and transmits the measured light L through at least one filter 310 and selectively controls the luminance, so that the measured light L is transmitted to the measurement unit 200 while the luminance is 100% or partially reduced. Accordingly, when the luminance of the measured light L exceeds a predetermined level, the luminance is reduced so that the measurement time in the measurement unit 200 increases, thereby accurately measuring the luminance and the color.

In addition, as the filter unit 300 selectively controls the luminance of the measured light L to transmit the measured light L, the measurement unit 200 is configured to divide the measured light L into a plurality of luminance areas in response thereto and apply a correction algorithm in response to each area.

When describing this in more detail, since the luminance of the measured light L is changed by the filter unit 300 and thus, the measured light L is not completely transmitted to the measurement unit 200, the measurement unit 200 may derive a correct measured result value by applying a separate algorithm to a result value of measuring the color and the luminance of the measured light L.

At this time, the algorithm is controlled by the measurement unit 200 according to the filter 310 applied to the measured light L, and a plurality of algorithms may be configured to correspond to each filter 310.

Like the embodiment, in the case where the filter 310 is configured as one filter to selectively transmit the measured light L, the filter 310 is configured to apply each of different algorithms depending on whether the filter 310 transmits the measured light L. Of course, unlike this, if a plurality of filters 310 is configured, the algorithm corresponding to each filter unit may be independently configured to apply an appropriate algorithm depending on whether the measured light L is transmitted.

As described above, the filter unit 300 according to the present invention has at least one filter 310 and is selectively applied according to the luminance of the measured light L to control the luminance of the measured light L and transmit the controlled luminance to the measurement unit 200. The measurement unit 200 may measure the color and the luminance of the measured light L by applying an appropriate algorithm corresponding to the degree of change in luminance of the measured light L depending on whether the filter 310 is applied and the type of the applied filter 310.

Meanwhile, in the path control unit 400, the measured light L is disposed on the movement path in the case 100 to transmit the measured light L to either the first measurer 210 or the second measurer 220. In this case, the path control unit 400 is configured to be selectively driven so that the measured light L is continuously transmitted to each of the first measurer 210 and the second measurer 220.

Specifically, the path control unit 400 includes a first reflector 410, a second reflector 420 and a direction changer 430.

The first reflector 410 is disposed adjacent to the light incident part 110, selectively positioned on the first path W1, and reflects the measured light L to the second path W2. Here, the first reflector 410 is configured by at least one reflective mirror and is disposed in a shape having a progress direction and an inclination of the measured light L to reflect the measured light L.

In the embodiment, the first reflector 410 has a reflection angle in a direction crossing the first path W1 and is configured to selectively control the position thereof.

Meanwhile, the second reflector 420 is disposed on the downstream of the first reflector 410 on the second path W2, and reflects the measured light L reflected from the first reflector 410 again. Specifically, the second reflector 420 is formed in a similar shape to the first reflector 410 and is disposed in a direction crossing the progress direction of the measured light L reflected from the first reflector 410 to be transmitted to the second measurer 220.

Here, the second reflector 420 also includes at least one reflective mirror and is positioned on the movement path of the measured light L reflected by the first reflector 410.

As such, the path on which the measured light L reflected from the first reflector 410 is reflected by the second reflector 420 and transmitted to the second measurer 220 becomes the second path W2, and accordingly, the measured light L may be selectively transmitted to the second measurer 220.

In the embodiment, the second reflector 420 is disposed in front of the second measurer 220 on the second path W2 in a fixed form, and reflects again the measured light L transmitted from the first reflector 410.

The direction changer 430 is configured to be selectively driven in the case 100 to control the position of the first reflector 410, and is connected to the first reflector 410 to control whether or not the first reflector 410 is disposed on the first path W1.

Specifically, the direction changer 430 is connected to the first reflector 410 and at least partially slides or rotates to control whether the first reflector 410 is disposed on the first path W1, thereby controlling whether the measured light L moves along the first path W1 or along the second path W2.

In the embodiment, the direction changer 430 is at least partially elongated and disposed adjacent to the light incident part 110, and controls the position of the first reflecting part 410 by sliding along a longitudinal direction.

In more detail, as illustrated in the drawings, the direction changer 430 includes a sliding guide 432 and a driving motor 434, and the sliding guide 432 is disposed in front of the first measurer 210 and configured so that the first reflector 410 slides along the longitudinal direction. At this time, the sliding guide 432 is formed in a long bar shape as illustrated in the drawings and configured so that the first reflector 410 is slidable, and is disposed at a position where there is no interference in front of the first measurer 210.

In addition, the driving motor 434 is connected to the first reflector 410 inside the case to control the position of the first reflector 410 along the sliding guide 432 and is selectively disposed between the first measurer 210 and the second measurer 110 to control the reflection of the measured light L. Here, even if the position of the first reflector 410 provided in the sliding guide 432 is controlled, the reflection angle is maintained without changing.

Accordingly, when the first reflector 410 is positioned on the first path W1, the measured light L is correctly reflected to be transmitted to the second reflector 420.

As described above, the direction changer 430 includes the sliding guide 432 and the driving motor 434 and selectively controls the position of the first reflector 410 to control whether the first reflector 410 is disposed on the first path W1, so that the measured light passing through the light incident part 110 is transmitted to either the first path W1 or the second path W2.

As described above, the color and luminance measuring device including the filter unit according to the present invention includes the case 100, the measurement unit 200, the filter unit 300, and the path control unit 400. The plurality of measurers measure the color and the luminance of the measured light L, and when the luminance of the measured light L is equal to or higher than a predetermined level, the filter unit 300 is applied to control and measure the luminance, thereby increasing a measurable area of the measured light L.

Next, when describing the state of controlling the luminance of the measured light L according to the present invention and measuring the luminance in the measurement unit 200, as illustrated in FIG. 5, the measurement unit 200 divides the luminance area into a first area and a second area to apply an independent correction algorithm, respectively.

In the case of the first area, the luminance of the measured light L is lower than a reference to be lower than a predetermined level measured by the measurement unit 200, and a separate correction algorithm is applied independently.

Specifically, in the first area, the luminance of the measured light L is low, and in general, when the luminance is low, the luminance and the color of the measured light L are measured by increasing a measurement time. In general, when the measurement time of the measured light L is increased, information on the color and the luminance measured by the measurement unit 200 is modified, and accordingly, signal discrimination is insufficient, so that it is preferred that the measurement time of the measured light L is not increased above the predetermined level.

Therefore, in the present invention, when the luminance of the measured light L corresponds to the first area, the filter unit 300 transmits the measured light L while the luminance of the measured light L is not reduced, and the measurement unit 200 corrects the measured light L to be measurable by applying a separate correction algorithm corresponding thereto.

As such, in the case where the luminance of the measured light L corresponds to the first area, when the correction algorithm is applied without reducing the luminance of the measured light L, a correlation between measurement time and the luminance may be derived in the same form as P1. In this case, a graph shown in FIG. 5 illustrates a result derived through a correction algorithm separately applied to the measured light L by the measurement unit 200, which may be shown in various forms according to the correction algorithm.

Meanwhile, the second area is an area continuous with the first area, and corresponds to an area in which the measured light L has luminance of a predetermined level or higher. Here, when the luminance of the measured light L corresponds to the second area, the filter unit 300 reduces the luminance of the measured light L, and the measurement unit 200 applies the correction algorithm corresponding to the second area.

Specifically, referring to FIG. 5, in a state in which the correction algorithm is applied to the measured light L of which the luminance is reduced by the filter unit 300 in the second area, the measured light L may derive a correction between the measurement time and the luminance in the same form as P2.

As described above, the luminance of the measured light L is selectively controlled to the filter unit 300 according to the luminance of the measured light L, and the measurement unit 200 applies a separate correction algorithm in response thereto. As a result, when the luminance of the measured light L is higher or lower than the measurement range, the filter unit 300 may apply a separate correction algorithm while controlling and measuring the luminance to derive the color and the luminance.

Unlike this, when the filter unit 300 does not exist, the measured light L has a reference measurement area as a graph of P3 shown in FIG. 5, and a measurable luminance range of the measured light L is relatively narrow.

On the contrary, like the present invention, the filter unit 300 is provided to reduce the luminance of the measured light L having luminance of a predetermined level or higher and then the measurement unit 200 measures the luminance and applies the correction algorithm in response thereto, thereby correctly deriving information about the color and the luminance of the measured light L.

Further, when the measurement unit 200 simply measures the color and the luminance by receiving the measured light L, the color and the luminance are measurable only in the luminance area corresponding to P3. Like the present invention, the measurement unit 200 applies a correction algorithm corresponding thereto with the filter unit 300, and the color and the luminance are measurable in both the luminance areas of P1 and P2, so that there is an advantage of relatively increasing the measurable luminance area.

Next, a state in which the filter unit 300 according to the present invention operates will be described with reference to FIGS. 6 and 7 as follows.

FIG. 6 is a view illustrating a state in which the measured light L is transmitted without changes by rotating the filter 310 in FIG. 1 and FIG. 7 is a view illustrating a state in which the measured light L passes through the filter 310 in FIG. 1.

As illustrated drawings, as described above, the filter unit 300 includes at least one or more filters 310 and the controller 320, and the position of the filter unit 300 is controlled by the controller 320.

Specifically, when the measured light L has luminance corresponding to the first area, as illustrated in FIG. 6, the filter 310 moves downward by rotating the controller 320 around the rotation shaft A.

At this time, the filter 310 is disposed between the measurement unit 200 and the light incident part 110 and moves to a position not disposed on the movement path of the measured light L, so that the measured light L is directly transmitted to the measurement unit 200 without passing through the filter 310.

Accordingly, the measurement unit 200 measures the luminance and the color by receiving the luminance of the measured light L without reduction, and applies the correction algorithm corresponding thereto to derive a measurement value.

On the other hand, when the measured light L has luminance corresponding to the second area, the filter 310 moves as illustrated in FIG. 7 to be disposed between the light incident part 110 and the measurement unit 200. In addition, the measured light L passes through the filter 310 to be transmitted to the measurement unit 200 in a state in which the luminance is reduced.

As such, the filter unit 300 selectively controls the luminance of the measured light L by selectively controlling the position of the filter 310 according to the luminance of the measured light L.

In the embodiment, the filter unit 300 has one filter 310 and is configured to control the position of the filter 310 in a form in which the controller 320 rotates, but unlike this, when a plurality of filters 310 is configured, the plurality of filters 310 are arranged in a radial form around the rotation shaft A of the controller 320 and may be configured so that the measured light L passes through any one of the filters according to a rotational angle.

As described above, the filter unit 300 may be formed in various forms, and although not illustrated in the embodiment, the filter unit 300 divides the measured light L into two or more luminance areas, and the filter unit 300 is configured to have the number of filters 310 corresponding to the luminance areas to pass through the appropriate filter 310 according to the luminance of the measured light L, thereby more accurately measuring the measured light L.

Next, operations of the filter unit 200 and the control unit according to the present invention will be described with reference to FIGS. 8 and 9 as follows.

FIG. 8 is a view illustrating a state in which the measured light L is incident to the first measurer 210 along the first path W1 in the color and luminance measuring device including the filter unit of FIG. 1 and FIG. 9 is a view illustrating a state in which the measured light L is incident to the second measurer 220 along the second path W2 in the color and luminance measuring device including the filter unit of FIG. 1.

In the luminance and color measuring device according to the present invention, as described above, the first measurer 210 and the second measurer 220 are each independently provided on the first path W1 and the second path W2 in the case 100 to receive and measure the measured light L incident through the light incident part 110, respectively.

Specifically, when describing the process in which the measured light L is incident to the first measurer 210 and the second measurer 220 in more detail, first, as illustrated in FIG. 8, the measured light L moves along the first path W1.

At this time, while the path control unit 400 controls the first reflector 410 not to be positioned on the first path W1 by sliding, the light incident through the light incident part 110 moves to the first path W1 as it is along the progress direction to be transmitted to the first measurer 210.

As illustrated in the drawings, the first reflector 410 moves downward by the direction changer 430 so as not to be positioned on the first path W1. As a result, the measured light L incident to the light incident part 110 moves as it is in the progress direction without additional interference.

Here, the first reflector 410 is configured to move along the sliding guide 432 by the operation of the driving motor 434, and the position on the sliding guide 432 is selectively controlled to be positioned on the first path W1 or disposed outside the first path W1.

As such, when the measured light L is incident to the first measurer 210, as described above, the measured light L moves along the first path W1 without interference by the path control unit 400.

Meanwhile, referring to FIG. 9, the measured light L moves along the second path W2 to be incident to the second measurer 220, and the first reflector 410 is disposed on the first path W1 by the path control unit 400.

At this time, the first reflector 410 reflects the measured light L incident along the first path W1 to move to the second path W2, and accordingly, the measured light L reflected from the first reflector 410 is transmitted to the second reflector 420. Then, the measured light L is reflected again by the second reflector 420 and then transmitted to the second measurer 220.

Here, the first reflector 410 is disposed on the first path W1 by sliding along the longitudinal direction of the sliding guide 432 while the arrangement angle is maintained, so that the measured light L is not transmitted to the first measurer 210 but reflected to move to the second path W2.

As such, the position of the first reflector 410 is controlled by the direction changer 430, and the movement path of the measured light L is selectively changed depending on whether the first reflector 410 is positioned on the first path W1, so that the measured light L moves to either the first measurer 210 or the second measurer 220.

As described above, the luminance and color measuring device according to the present invention may receive the measured light L through the first measurer 210 and the second measurer 220, respectively, and may continuously receive the measured light L by the path control unit 400 to measure both the luminance and the color of the measured light L.

Here, both the first measurer 210 and the second measurer 220 may measure the color and the luminance at the same point in the object 10 to be measured by using the measured light L incident through the light incident part 110 at the same position.

In the embodiment of the present invention, the path control unit 400 is configured to be positioned in front of the filter unit 300 to control the path of the measured light L, but unlike this, the path control unit 400 may also be configured so that the measured light L passes through the filter unit 300 and then passes through the path control unit 400 to be transmitted to either the first path W1 or the second path W2.

As described above, the preferred embodiments of the present invention have been described, and the present invention can be embodied in other forms without departing from the spirit or scope of the present invention in addition to the aforementioned embodiment. Therefore, the embodiment is not limited to a specific form but should be considered to be illustrative, and as a result, the present invention is not limited to the above description and may be modified within the scope of the appended claims and a range equivalent thereto.

EXPLANATION OF REFERENCE NUMERALS AND SYMBOLS

100: Case
110: Light incident part
200: Measurement unit
210: First measurer
220: Second measurer
300: Filter unit
310: Filter
320: Controller
400: Path control unit
410: First reflector
420: Second reflector
430: Direction changer
W1: First path
W2: Second path

The invention claimed is:

1. A color and luminance measuring device comprising:
    a case which covers the entire device and has a light incident part formed on one side thereof through which measured light emitted from an object to be measured is incident;
    a measuring device which measures luminance and color by receiving the measured light in the case; and
    a filter which is disposed on a movement path of the measured light in the case to selectively control the luminance of the measured light transmitted to the measuring device and transmit the measured light,
    wherein the filter reduces the luminance of the measured light to a predetermined level when the measured light has luminance of a predetermined level or higher and transmits the measured light to the measuring device,
    wherein the measuring device comprises:
        a first measurer which is disposed on a first path through which the measured light incident through the incident part moves while maintaining a moving direction to measure at least one of the luminance and the color of the measured light; and
        a second measurer which has a path branched from the first path and is disposed on a second path through which the measured light is refracted or reflected at least one or more times and moves to measure the other one of the luminance and the color of the measured light which is different from the first measurer.

2. The color and luminance measuring device of claim 1, wherein the measuring device divides the measured light into a plurality of luminance areas and measures the luminance and the color of the measured light transmitted by applying a correction algorithm corresponding to each area.

3. The color and luminance measuring device of claim 1, wherein the filter comprises:
    a filter which is provided in the case to control the luminance of the measured light to be transmitted; and
    a controller which is connected to the filter to control the filter to be selectively disposed between the light incident part and the measuring device.

4. The color and luminance measuring device of claim 3, wherein a plurality of filters are configured to have different transmittances, and any one thereof is disposed between the measuring device and the light incident part by the controller.

5. The color and luminance measuring device of claim 4, wherein any one of the plurality of filters transmits the measured light without reduction of the luminance.

6. The color and luminance measuring device of claim 1, further comprising:
    a path controller which transmits the measured light to either the first measurer or the second measurer,
    wherein the path controller is selectively driven to continuously transmit the measured light to the first measurer and the second measurer, respectively.

7. The color and luminance measuring device of claim 6, wherein the path controller comprises:
    a first reflector which is disposed adjacent to the light incident part and selectively positioned on the first path to reflect the measured light;
    a second reflector which is disposed on the downstream of the first reflector on the second path to reflect the measured light reflected from the first reflector; and
    a direction changer which is connected with the first reflector in the case and controls the position of the first reflector to control whether the first reflector is disposed on the first path.

8. The color and luminance measuring device of claim 7, wherein the direction changer is at least partially elongated and disposed adjacent to the light incident part to control the position of the first reflector by sliding along a longitudinal direction.

* * * * *